United States Patent [19]

Röhm et al.

[11] 3,911,582
[45] Oct. 14, 1975

[54] DOSING APPARATUS FOR MIXING THE CONSTITUENTS OF TOOTH FILLINGS

[75] Inventors: Fritz Röhm, Stuttgart-Kaltental; Heinz Strähle, Schwabisch Gumnd, both of Germany

[73] Assignee: Deutsche Gold- und Silber-Scheideanstalt vormals Roessler, Frankfurt am Main, Germany

[22] Filed: Apr. 29, 1974

[21] Appl. No.: 465,362

[30] Foreign Application Priority Data
May 5, 1973 Germany.......................... 2322681

[52] U.S. Cl.................................. 32/40 R; 222/139
[51] Int. Cl.² ......................................... A61C 3/00
[58] Field of Search .......... 259/DIG. 20, 72; 32/39, 32/40 A; 222/145, 146, 136, 139, 183

[56] References Cited
UNITED STATES PATENTS
2,844,284  7/1958  Ackerman, Jr. .................... 222/139
3,115,263  12/1963  Leslie-Smith ......................... 215/13

Primary Examiner—Robert Peshock
Attorney, Agent, or Firm—Cushman, Darby & Cushman

[57] ABSTRACT

A dosing apparatus for the mixture constituents of dental filings of the type including supply containers for mercury and for amalgam filings and a dosing cylinder in which there is provided a funnel-shaped insert made of material having low friction, the insert serves as supply container for the amalgam filings and has an outlet spout shaped to seat on the dosing cylinder to form an all-around seal which is maintained by spring pressure.

2 Claims, 3 Drawing Figures

DOSING APPARATUS FOR MIXING THE CONSTITUENTS OF TOOTH FILLINGS

The invention concerns a dosing apparatus for the mixture constituents of dental fillings, having supply containers for mercury and for amalgam filings and having a dosing cylinder.

An apparatus of this kind has one supply container for mercury and one for amalgam filings and the dosing takes place into two separate chambers of a dosing cylinder. By rotation of this cylinder through 180°, both mixture constituents are emptied into a funnel terminating in the so-called mixing tube.

In known apparatus, the dosing cylinder is embodied with a step-wise variation of its diameter in the individual sections. For example, below the supply container for the mercury, the gap between the dosing cylinder and its guide bushing is only approximately 1/100 to 2/100 mm in order that no mercury may enter the space between the dosing cylinder and the guide bushing. On the other hand, the gap below the supply container for the amalgam filings must be relatively large, for example approximately 4/100 to 6/100 mm, in order that the dosing cylinder will not jam even in the event that small particles of the hard amalgam filings enter the space between the dosing cylinder and the guide bushing. Additional sealing against the lateral entry of mercury or amalgam filings into the adjacent spaces between the dosing cylinder and the guide bushing is achieved by the use of sealing rings, for example felt rings, where the rings must possess additional dry-running characteristics.

The known apparatus is suitable, however, only for processing of amalgam filings with chips larger than 40 $\mu$m whose major portion lies between approximately 50 and 60 $\mu$m. The fine-chip and spherical amalgams preferably employed lately and whose chip size is less than 40 $\mu$m (preferably 10 – 30 $\mu$m) can, on the other hand, no longer be dosed without special sealing.

It has been shown, in addition, that the customary sealing rings are abraded during the use of the apparatus and not only lose their function but that the abrasion can even be the cause for the jamming of the dosing cylinder in that the abraded particles are rolled onto the dosing shaft and lead to surface damage (e.g. frictional oxidation).

The object of the invention is a dosing apparatus for the mixture constituents of dental fillings having supply containers for mercury and for amalgam filings and having a dosing cylinder which is characterized in that a funnel-shaped insert made of material having low friction is inserted into the housing to serve as supply container for the amalgam filings and that its outlet spout is so fitted as to be seated on the dosing cylinder to form an all-around seal and that it is pressed against the dosing cylinder by a spring.

The funnel-shaped insert can be made, for example, of a polyamide (e.g. nylon 6 or nylon 6,6) or a polyacetal (e.g. Delrin, which is a polyformaldehyde). The preferred material, however, is polytetrafluoroethylene. The upper portion of the insert has a cylindrical form and it tapers downwardly to form an outlet spout. Its wall thickness is approximately 1 mm and its shape corresponds approximately to that of the housing so that it lies substantially adjacent to the inner wall of the housing. Only at the location of the taper toward the outlet spout does there remain a certain separation from the housing wall because the outlet spout is made somewhat longer than the corresponding housing member. The outlet spout is provided with a recess in such a way as to seat sealingly on the dosing cylinder.

During the installation, the bore of the outlet spout must be so adjusted that it is located directly above the dosing chamber in the dosing cylinder and that it has a diameter corresponding to that of the dosing chamber. The all-around sealing of the dosing chamber is thus completely assured. Therefore, the diameter of the dosing cylinder could be reduced by 5/10 in this region so that particles which may possibly fall through can cause no roll-on and, therefore, no jamming. Because of the fact that the funnel-shaped insert presents a certain separation from the housing wall at the location of the taper, and because it is pressed against the dosing cylinder by a spring, the abrasion of the outlet spout occurring during use has no effect, so that an effective seal is assured even during a longer time span.

A further improvement of the entire sealing and dry-running characteristics is achieved by the use of sealing rings made of polytetrafluoroethylene. The rings must exhibit a certain amount of elasticity; if they are made as seamless, firmly guided rings, they must be double rings, in which case an elastic rubber resilient ring is inserted in the base of the ring guide and the polytetrafluoroethylene ring is placed above it to act as sealing and bearing ring.

These and other objects of the present invention will become more apparent during the course of the following detailed description and appended claims.

The invention may best be understood with reference to the accompanying drawings wherein an illustrative embodiment is shown.

Figure 1:
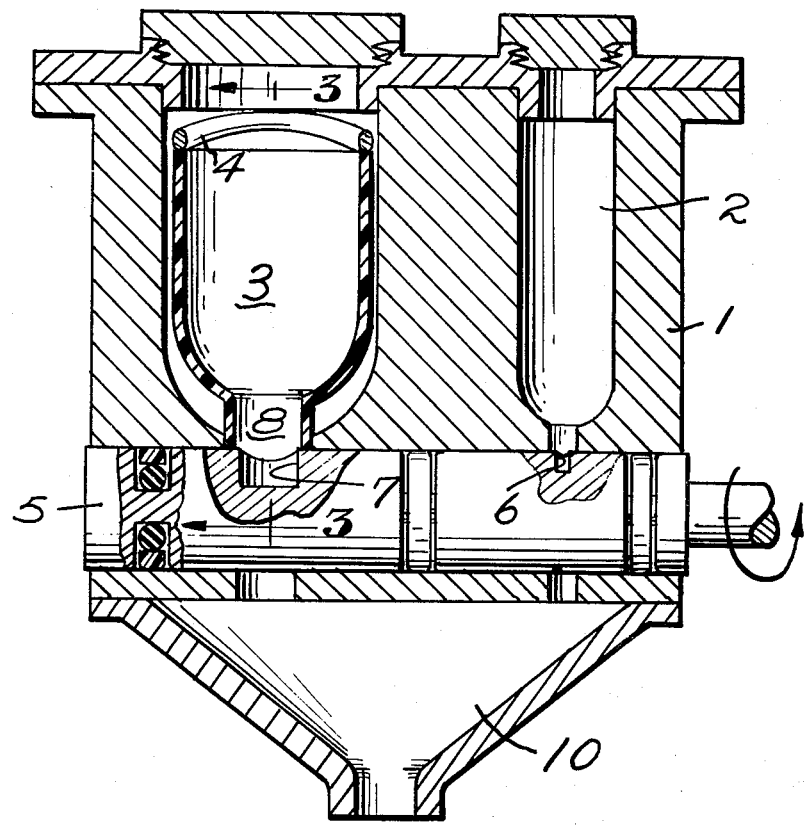
FIG. 1 is a vertical sectional view of a dosing apparatus embodying the principles of the present invention.
Figure 2:
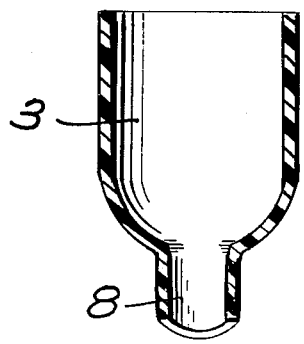
FIG. 2 is a vertical sectional view of the funnel-shaped insert utilized in the apparatus.
Figure 3:
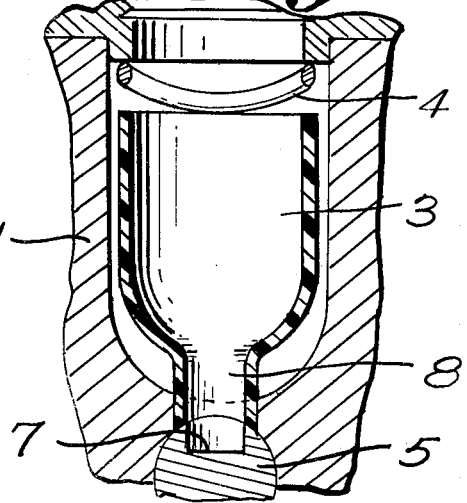
FIG. 3 is a fragmentary sectional view taken along the line 3—3 of FIG. 1.

The dosing apparatus shown in FIG. 1 consists of a housing 1 which terminates below in a funnel 10. It comprises a relatively thin supply container 2 for mercury and the funnel-shaped insert 3, serving as supply container for the amalgam filings and which is pressed against the dosing cylinder 5 by the spring 4. The dosing cylinder 5 includes a dosing chamber 6 for mercury and a dosing chamber 7 for the amalgam filings.

The funnel-shaped insert 3 includes an outlet spout 8 having an arcuately shaped end surface conforming to the portion of the exterior surface of the dosing cylinder 5 surrounding the amalgam filings dosing chamber 7. The spring 4 may be of any desired construction but is shown as a ring of resilient material which is normally curved arcuately and mounted between the upper housing part and upper surface of the funnel-shaped insert 3 so as to contact the latter at two diametrically opposed portions and the former at two diametrically opposed portions displaced 90° from the first-mentioned portions.

In operation, the container 2 and funnel-shaped insert 3 are provided with mercury and amalgam filings respectively. In the position shown in FIG. 1 of the drawings, the dosing cylinder 5 is in a constituent receiving position wherein the dosing chambers 6 and 7 communicate respectively with the lower discharge ends of the associated supply containers 2 and 3. In this way, the dosing chambers are filled with mercury and amalgam filings to provide a measured dose thereof. The dosing cylinder 5 is mounted within the housing 1 for rotational movement about the axis of the dosing cylinder 5 for movement from the constitutent receiving position shown in the drawings to a diametrically opposed discharging position. In this position, the constituents fall by gravity into the funnel 10 where they are collected and mixed in accordance with usual practice. When the dosing cylinder 5 is then moved back into its constituent receiving position, the constituents in the supply containers 2 and 3 will again fill the respective dosing chambers 6 and 7. It will be noted that when the dosing cylinder 5 is in its constituent receiving position, the end surface of the spout 8 of the funnel shaped insert 3 surrounds the associated dosing chamber 7 and is urged into sealing engagement with the adjacent exterior surface of the dosing cylinder 5. This sealing engagement is maintained by the spring 4 under spring pressure. However, the spring pressure interengagement does not set up excessive frictional forces, due to the low friction characteristics of the material from which the insert 3 is formed. Thus, during the movement of the dosing cylinder 5 from its constituent receiving position to its constituent discharging position, the sealing engagement is maintained and thus the entry of amalgam filings between the end surface of the spout and the engaged exterior surface of the cylinder 5 is prevented.

In order to insure that the dosing cylinder 5 will easily slide in the bore or opening of the housing 1 within which it is mounted, it is important to have a good guiding of the two parts relative to each other. It is not possible to lubricate the cylinder since the lubricant or the lubricant residue would prevent the exact dosing of the mercury or alloy filings. Therefore preferably, sliding rings are installed which also function as packing or sealing rings between the individual zones of the dosing cylinder. They make possible a smooth low friction, oil free sliding of the chromed steel cylinder 5 in the steel housing 1. Moreover, they make the juncture fluid-tight that no mercury or metal filings (size 2 to 30 μm) can wander from one zone to the other. Also diffusion of mercury is prevented.

Sliding and sealing rings of this type have previously been produced from felt or pretreated felt (for example paraffinated, polytetrafluoroethylene coated) whereby the danger always prevails that individual felt hairs can come to lie between the sleeve and the shaft in the installation and cause corrosion or lead to the cylinder. In accordance with the teachings of the present invention grooves are formed in the dosing cylinder, as shown in FIG. 1, each of which receives on outer ring 11 of PTFE and an inner ring 12 of elastic synthetic resin. This preferred construction provides considerably longer service of the doser than previously (averaging 80,000 to 100,000 doses in which each dosing cycle consists of a forward and backward turning of 1,800 of the dosing cylinder in the dosing housing 1 or a cycle of 360°).

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. Dosing apparatus for the mixture constituents of dental fillings comprising
    a housing structure having means defining supply containers for mercury and for amalgam filings,
    a dosing cylinder rotatably mounted in said housing structure for movement between constituent receiving and constituent discharging positions,
    said dosing cylinder having dosing chambers formed therein in positions to communicate with said supply containers when said dosing cylinder is in said constituent receiving position,
    a funnel-shaped insert made of material having low friction disposed within the supply container for the amalgam filings,
    said insert having an outlet spout of a shape complementary with the dosing cylinder seated on the dosing cylinder to form an all-around seal with respect to the associated dosing chamber when said dosing cylinder is in said constituent receiving position, and
    spring means for resiliently urging the outlet spout of said insert into said seated relation with said dosing cylinder.

2. Dosing apparatus as defined in claim 1 wherein said funnel-shaped insert is made of polytetrafluoroethylene.

* * * * *